350-96.24 SR

E197A XR 3,680,078

P-96.24

Baskin et al.

3,680,078

[45] July 25, 1972

[54] LIGHT PEN ARRANGEMENT FOR PROVIDING THREE DEGREES OF FREEDOM FOR A LIGHT PEN IN AN INTERACTIVE GRAPHICS SYSTEM

[72] Inventors: Herbert B. Baskin, Pinole, Calif.; Laszlo A. Belady, Yorktown Heights; Carlo J. Evangelisti, Jefferson Valley, both of N.Y.; Stephen P. Morse, Paris, France

[73] Assignee: International Business Machines Corporation, Armonk, N.Y.

[22] Filed: Dec. 23, 1969

[21] Appl. No.: 887,702

[52] U.S. Cl. ....................340/324 A, 178/18, 250/217, 250/227, 340/380

[51] Int. Cl. ....................G06f 3/14

[58] Field of Search..............250/217, 227; 340/324 A, 380; 178/18–20

[56] References Cited

UNITED STATES PATENTS

| | | | |
|---|---|---|---|
| 3,089,918 | 5/1963 | Graham | 340/324 |
| 3,337,860 | 8/1967 | O'Hara | 340/324 |
| 3,394,366 | 7/1968 | Dye | 340/324 |
| 3,505,561 | 4/1970 | Ward et al | 340/324 |
| 3,440,638 | 4/1969 | Van Valkenberg | 250/217 |
| 3,505,666 | 4/1970 | Thorpe | 250/227 |

*Primary Examiner*—John W. Caldwell
*Assistant Examiner*—Marshall M. Curtis
*Attorney*—Hanifin and Jancin and Isidore Match

[57] ABSTRACT

A light pen arrangement is described wherein the light pen has three degrees of freedom, viz. two-dimensional translation in the (X,Y) plane of a cathode ray tube screen and rotation about the projection of its own longitudinal axis to the normal of the screen. To sense the angular position of the light pen, at least two independent light sensitive elements, i.e., fiber optic bundles are required, the latter being suitably provided by dividing the bundle of fiber optics emerging from a single light pen into at least two separate groups and having photosensitive transducer respectively associated with each of the separate groups. When the light pen is placed on the screen and its presence there is sensed, an (X,Y) value pair is stored for the location of each light sensitive area of the light pen, i.e., each of the aforementioned separate fiber optic groups. The storing is accomplished by having an electron beam draw lines or points in each light sensitive area and, receiving in response thereto, interrupts for points or lines in the field of view of each fiber optic group, the (X,Y) coordinate of each point or line causing an interrupt and the fiber optic group that picked up the interrupt is now known to the computer or other control arrangement controlling the cathode ray tube. The computer or control arrangement can then compute the (X,Y) location of the light pen as the centroid of the individual areas and the angular position of the pen.

2 Claims, 6 Drawing Figures

INVENTORS
HERBERT B. BASKIN
LASZLO A. BELADY
CARLO J. EVANGELISTI
STEPHEN P. MORSE

BY Isidore Match
ATTORNEY

LIGHT PEN ARRANGEMENT FOR PROVIDING THREE DEGREES OF FREEDOM FOR A LIGHT PEN IN AN INTERACTIVE GRAPHICS SYSTEM

BACKGROUND OF THE INVENTION

This invention relates to light pen arrangements. More particularly, it relates to improved light pen arrangements wherein a computer or other control for which a cathode ray tube in conjunction with a light pen is used as an input-output device can determine both the location and orientation (in the X,Y plane) of the light pen.

Cathode ray tube screens in conjunction with light pen arrangements are well known input-output devices for computer systems. In the operation of such devices, the computer senses the location of the light pen on the screen by causing an electron beam to draw lines or points on the screen and, in return, receives interrupts on those lines or points that are in the light pen's field of view. The computer can thus determine the location but not the orientation (in the X,Y plane) of the light pen.

Changes in the location of the light pen are frequently used as operands of functions that perform manipulations on images displayed on the cathode ray tube screen. For example, a computer can be programmed so that any motion, i.e., translation of the light pen, causes some images on the screen to be translated by a commensurate amount. However, using the change in light pen position as the operand of a function presents disadvantages in the case of those functions which require an angle as an operand. For example, the conventional techniques for specifying a rotation are awkward both from a human factors standpoint and from a computational standpoint. Thus, it is very desirable for a computer or input-output device to be able to sense the orientation of the light pen as well as its location. With such ability, changes in orientation could then be used as arguments for functions such as rotate, for example.

Accordingly, it is an important object of this invention to provide a light pen arrangement having three degrees of freedom.

It is another object of this invention to provide a light pen arrangement in accordance with the preceding object which is capable of two-dimensional translation in the (X,Y) plane of the cathode ray tube screen and rotation around its own longitudinal axis, i.e., around a projection of the axis to the normal of the screen.

SUMMARY OF THE INVENTION

In accordance with the invention, there is provided in a display system which comprises a cathode ray tube having a screen, storage means for containing display and control data, and control means for respectively effecting various display operations and for handling interrupts, a light pen arrangement wherein the light pen has three degrees of freedom. The light pen arrangement includes light pen means operatively associated with the display system, the arrangement being capable of sensing two-dimensional translation by the pen in the plane of the tube's screen and rotation of the pen around the projection of the longitudinal axis of the pen to the normal of the screen. The light pen means comprises at least two independent light transmitting elements, respective photosensitive transducers being associated with each of the elements. Means are provided responsive to the sensing of the light pen on the screen for storing in the storage means an (X,Y) value pair for the respective locational areas of each of the light sensitive elements and means are also included for causing the electron beam of the tube to draw lines or points in the respective fields of view of each of the light sensitive elements. There are also provided means for ascertaining the X,Y coordinate of each point or line causing an interrupt and the light sensitive element picking up the latter interrupt, and means responsive to the X,Y coordinate and the interrupt information for determining the angular position of the pen, and the (X,Y) location of the pen as the centroid of the light sensitive areas.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
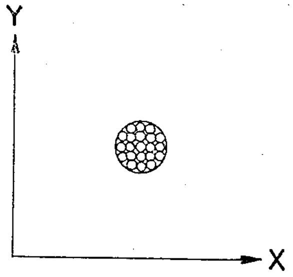
FIG. 1 is a depiction of the known light pen arrangement.

Referring now to FIG. 1, there is shown a schematic depiction of the operation of the known light pen arrangement and its known capability of sensing the orientation in the X,Y plane of a light pen in an interactive graphics system. It is seen that all that can be sensed as to the position of the light pen is its location.

Figure 2:
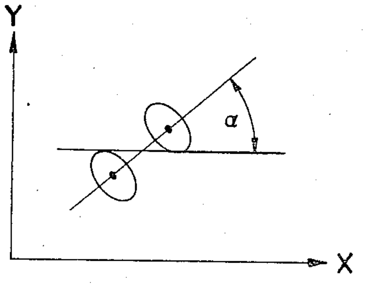
FIG. 2 is a depiction similar to FIG. 1 and shows an arrangement in accordance with the principles of the invention.

In FIG. 2, it is illustrated as to how the angular position of the light pen can also be sensed. This requires the providing of at least two fiber optic bundles. The providing of two such bundles can be achieved, for example, by separating the single bundle fiber optics emerging from the light pen into two separate groups and providing a separate transducer for each of the groups.

In the operation of the embodiment depicted in FIG. 2, when the light pen is placed on the screen of the cathode ray tube and its presence there is sensed, an (X,Y) value pair is stored for the location of each light sensitive area of the light pen, i.e., each fiber optic group. The latter is achieved by having an electron beam draw lines or points in each light sensitive area of the pen to generate interrupts for points or lines in the field of view of each fiber optic group. The (X,Y) coordinates of each point or line causing an interrupt as well as the fiber optic group that picked up the interrupt is now known to the computer or other control devices. Thus, the computer can then compute the (X,Y) location of the pen as the centroid of the individual areas in accordance with known features and the angular position as the angle $\alpha$ as defined in FIG. 2.

Figure 3:
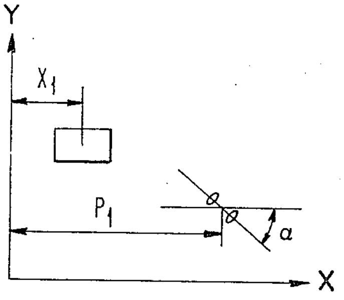
FIG. 3 and 4 are diagrams similar to that of FIG. 2 which illustrates the operation of the invention.
Figure 4:
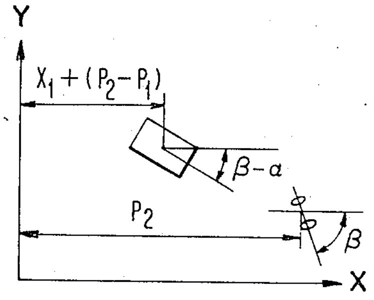

An example of the use of the light pen arrangement according to the invention is depicted in FIGS. 3 and 4 which illustrate a combined translation and rotation of an image by moving the pen horizontally while simultaneously twisting it whereby the image rotates around its own centroid. FIG. 3 in this connection shows a cathode ray tube screen image prior to the movement of the pen, and FIG. 4 shows the disposition of the same image when the pen is moved horizontally and simultaneously twisted. In these FIGS., $X_1$ and $P_1$ represent the position of the cathode ray tube screen image and the light pen prior to movement of the pen, $X_1+(P_2-P_1)$ and $P_2$ represent the position of the image and the light pen after movement of the pen. The rotation of the pen is equal to $\beta-\alpha$. The image rotates around its own centroid.

Another possible mode of operation with the light pen according to the invention is when images are rotated around the instantaneous axis of the pen itself. The implied center or rotation in this case is then the light pen as distinguished from the case mentioned immediately here and above and illustrated in FIGS. 3 and 4 where images rotate about their own centroids.

Figure 5:
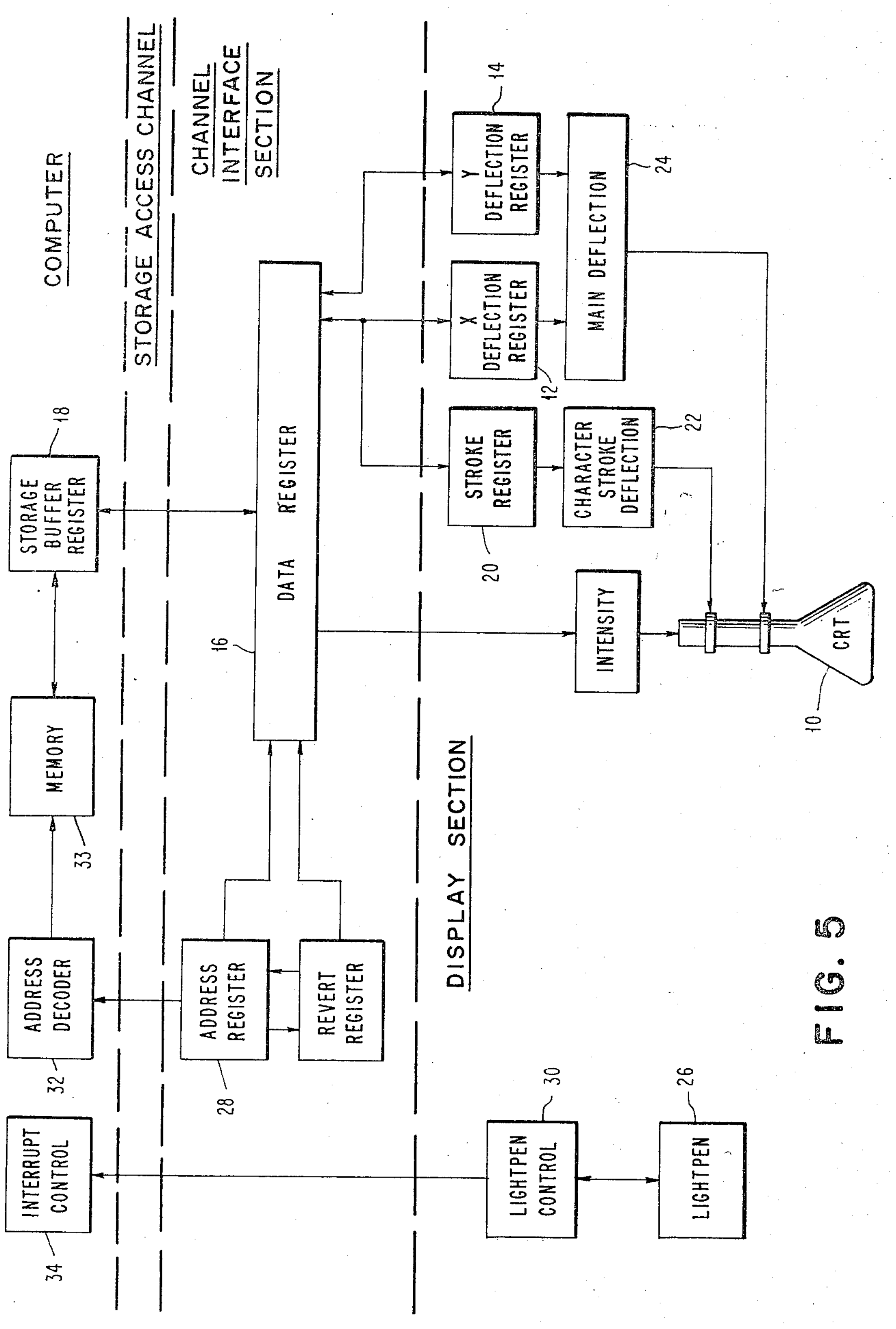
FIG. 5 is a block diagram of an interactive graphics system wherein the invention may suitably be employed.

Reference is now made to FIG. 5 wherein there is shown a display system wherein the inventive light pen arrangement is advantageously employed. In this FIG., there is shown a block diagram of an interactive display system which may be computer controlled or controlled by other suitable control means. The system shown in FIG. 5 is, in fact, that of the IBM 2250 display unit which is suitably controlled by a general purpose computer such as the IBM 1130 computer. The structure and operation of the IBM 2250 display unit are described in the IBM Systems Reference Library Publication entitled "IBM 1130 Computing System Component Description, IBM 2250 Display Unit Model 4," form No. 1130–03, form A27–2723–1.

The display section portion of FIG. 5 which is the aforementioned 2250 display unit, under the control of a display program in computer storage, generates images on the display area of a cathode ray tube 10. The image can comprise straight lines, points, and characters. A visible display is produced when an electron beam in cathode ray tube 10 strikes the phosphor coated cathode ray tube screen causing the portion of the coating struck by the beam to glow briefly. As is well known, normally a glow on a cathode ray tube screen fades within a fraction of a second, i.e., too soon for the human eye to carefully perceive and identify the image. For this reason, the display is continuously generated at a rate that causes it to appear steady and stationary to an observer. Such regeneration is performed automatically under control of the display program in the controlling computer's storage.

The addressing of storage in the computer is performed in that portion of FIG. 5 legended channel interface section. Once regeneration is started by a computer input-output control command, this interface section continuously fetches orders and data from the display program in storage. Display orders are decoded in this section and deflection information is transferred to the display section where it is used to draw the appropriate display, regeneration being accomplished by continuously repeating the display program.

Relative to displays, the display program is sent to the display unit from the computer through the storage access channel. The orders in this program specify electron beam deflection, such information being received in an X deflection register 12 and a Y deflection register 14 in the display unit from a data register 16 in the channel interface section, the latter register communicating with a storage buffer register 18 in the computer. Positioning orders in the display program select the X and Y coordinates for each element of a display, i.e., a point, a line end point, and character area centroid.

The display unit can display information in either of two modes, i.e., graphic or character. Consequently, there is also provided a stroke register 20 whose output in turn is applied to a character stroke deflection stage 22, the output of the latter stage being applied to cathode ray tube 10. The outputs of X and Y deflection registers 12 and 14 are applied to cathode ray tube 10 through a main deflection stage. The light pen which is diagramatically depicted by a box 26 is suitably a fiber optic device of the known type which can provide two independent inputs to the display unit, viz. a light pen detect and a light pen switch. A light pen detect occurs when a user thereof points a light pen at the section of the displayed image that he wants to identify to the display program. A light pen detect can occur whenever light from the cathode ray tube beam passes within the light pen's field of view. When the light pen is in the desired position, the user can press the pen tip against the faceplate of the cathode ray to activate a tip switch. The program is so arranged whereby it can disable or ignore light pen detects and ignore switch closures or it can establish any one of the following conditions as significant:

1. Light pen switch close (detect or no detect)
2. Light pen detect (switch open or close)
3. Light pen detect and light pen switch close When the light pen detects are enabled or made significant by the program, a detect can occur each time an unblanked cathode ray tube beam passes within the light pen's field of view. Consequently, as is well known, a "continuous detect" mode can be employed for light pen tracking. In addition, the display program can be arranged such that the light pen can be ignored while certain information such as a background grid is being displayed to inhibit light pen initiated operations on such information.

As is seen in FIG. 5, the channel interface section interfaces the storage access channel and the display section. The function of this section is to decode and execute orders and commands, address the computer storage, and handle data transferred to or from the computer storage.

The address register 28 in the channel interface section specifies to the computer storage (not shown) through an address decode stage 32 the location at which information will be stored upon which it will be retrieved for the display unit's operations. The display program includes interrupt orders which may be used for conditional or unconditional branching to any location storage for interrupting the computer and for other operations. An interrupt stops regeneration of the display.

It is noted that light pen stage 26 is controlled by a light pen control 30 which in turn communicates with the interrupt control state 34 in the computer. The revert register 36 contains the address of the main display program list when a branch occurs. The computer memory 33 receives information from address decoder stage 32 and intercommunicates with stage buffer register 18.

Figure 6:
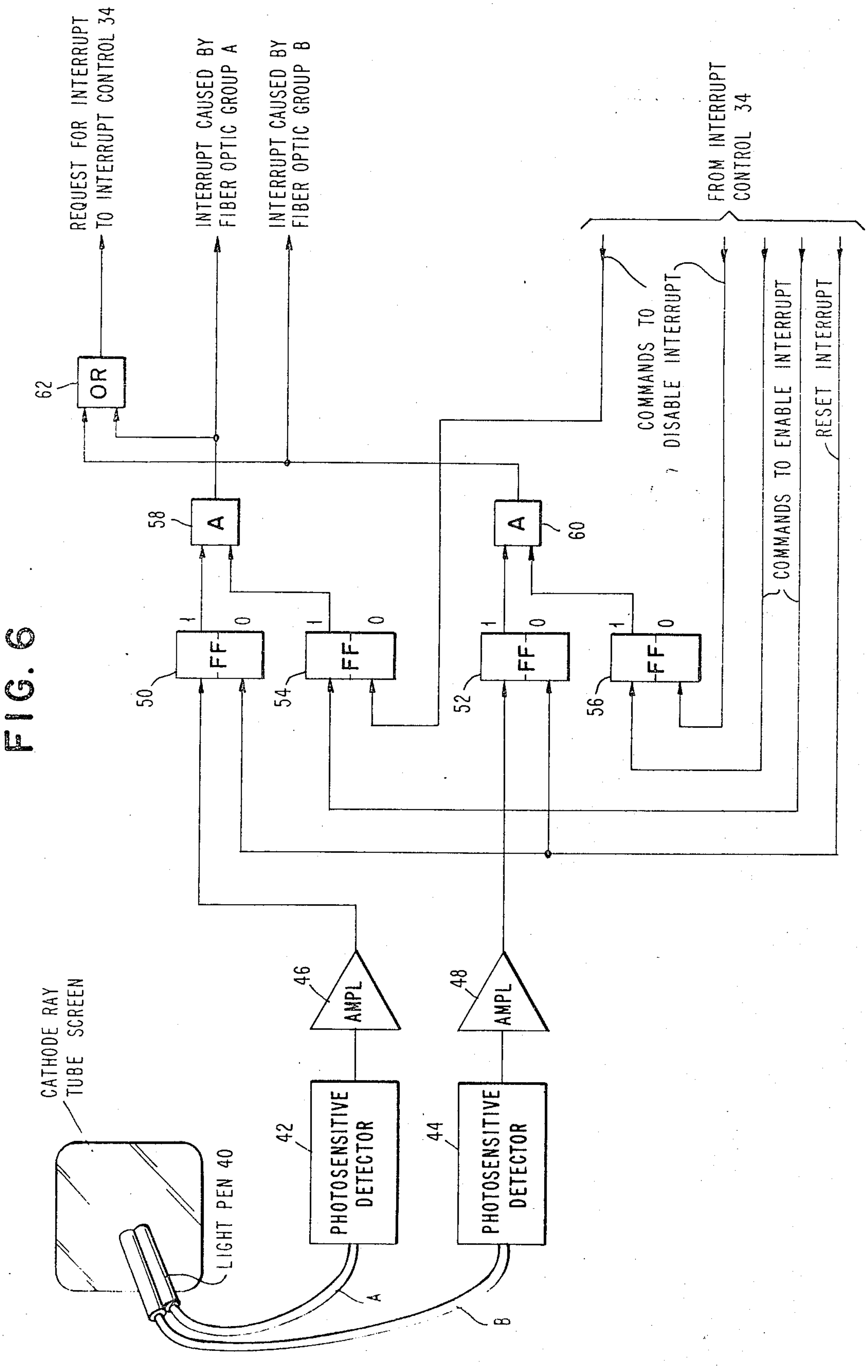
FIG. 6 is a diagram of an illustrative embodiment of a logic arrangement which enables the invention to be used in a system such as shown in FIG. 5.

Reference is now made to FIG. 6 wherein there is shown a logic arrangement suitable for use in implementing the invention in an interactive graphics system. It is seen in this FIG. that the light pen comprises two fiber optic groups A and B. The outputs of groups A and B are respectively applied to associated photosensitive detectors 42 and 44, the outputs of detectors 42 and 44 being amplified in amplifiers 46 and 48. The output of amplifier 46 is employed to switch a flip-flop 50 to its set state, and the output of amplifier 48 is employed to switch a flip-flop 52 to its set state. Flip-flops 54 and 56 are switched to their set states by commands from the computer or control device to enable interrupts. The set, i.e., the "1" outputs of flip-flops 50 and 54 are applied as inputs to an AND circuit 58 and the set, i.e., the "1" outputs of flip-flops 52 and 56 are applied as inputs to an AND circuit 60. Flip-flops 50 and 52 are switched to their reset states by a reset interrupt command to thereby disable AND circuits 58 and 60 and flip-flops 54 and 56 are respectively switched to their reset states by commands to disable interrupts to also thereby disable AND circuits 58 and 60. When either AND circuit 58 or 60 is enabled, an output appears from an OR circuit 62 to produce a request for interrupt signal which is sent to the computer whereby the light pen interrupt is operative. An output from AND circuit 58 represents an interrupt caused by fiber optic group A and an output from AND circuit 60 represents an interrupt caused by fiber optic group B.

In considering the operation of the arrangement shown in FIG. 6, when light pen 40 is placed upon the cathode ray tube screen, and (X,Y) value pair is stored for the location of each light sensitive area of the two fiber optic groups as has been mentioned above, this is accomplished by having the electron beam of the cathode ray tube draw a line or point in each light sensitive area of pen 40 to receive back interrupts for points or lines in the field of fiber optic groups A and B. The (X,Y) coordinates of each point or line causing an interrupt as well as the fiber optic group that picks up the interrupt is now known to the computer. The computer, in accordance with known interactive graphic technique, can then compute the (X,Y) location of pen 40 as the centroid of the individual areas and the angular position of the angle of rotation.

What is claimed is:

1. In an interactive graphics display system comprising an interactive graphics display unit controlled by a computer, said interactive graphics display unit comprising a cathode ray tube having an electron beam controlled by said computer, and a screen, said computer including storage means for containing display and control data, said system being adapted to interact with a light pen arrangement and containing light pen detect control means which is actuated in response to said interaction with said light pen arrangement, the improvement which comprises;

light pen means comprising at least two independent light transmitting sensitive elements;

light sensitive transducers respectively associated with each of said light transmitting elements;

electron beam deflection means which is controlled by said computer for causing said electron beam to draw lines for points on said screen;

means responsive to the interaction of said light pen means with said interactive display unit for actuating said light pen detect control means to cause the production of light pen detects for lines or points in the respective fields of view of each of said light transmitting elements;

means for ascertaining the (X,Y) coordinates of each point of a line causing a light pen detect;

means for ascertaining the respective light pen detects caused by said light transmitting elements; and, means responsive to said (X,Y) coordinates and light transmitting elements light pen detects information for determining the angular position and the (X,Y) location on the screen of said interactive graphics unit of said light pen means.

2. In a system as defined in claim 1, wherein said light transmitting elements are respective fiber optic bundles.

* * * * *